Figure 1:
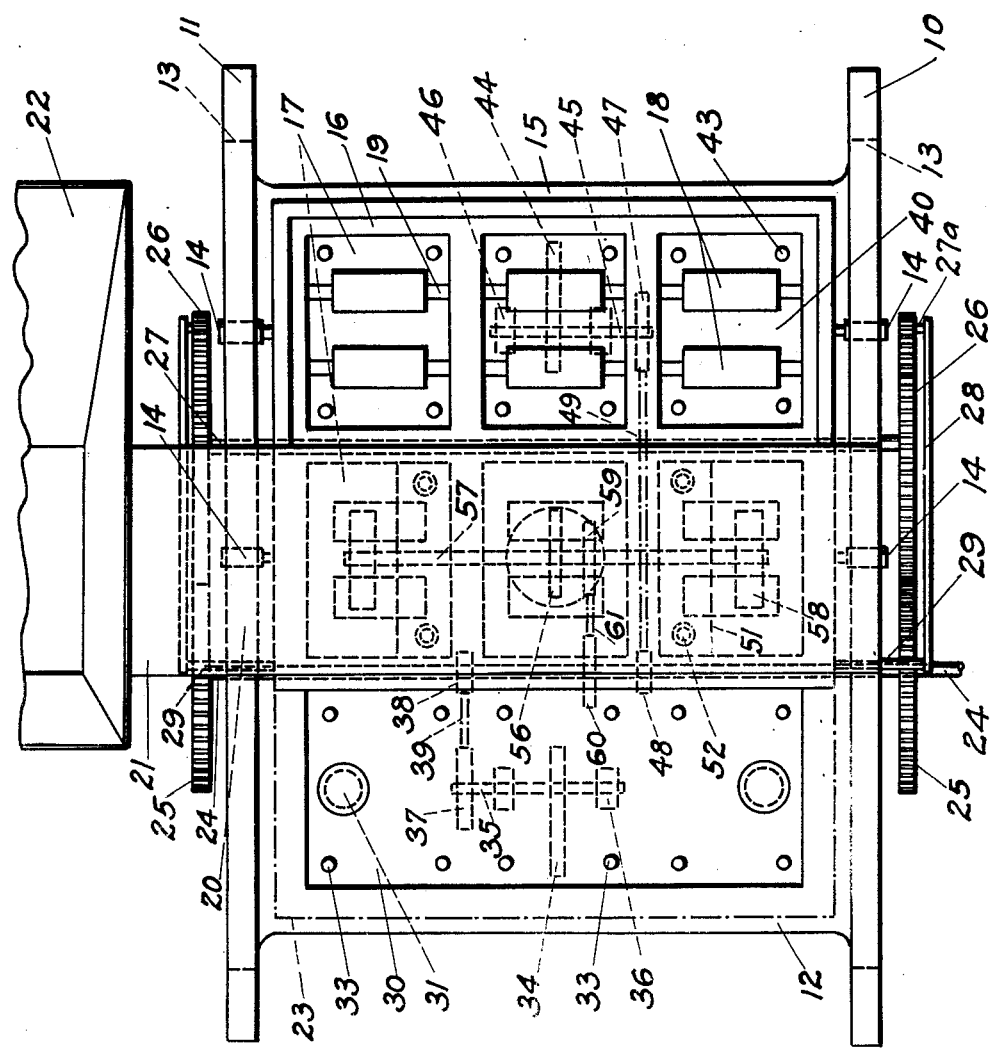

June 4, 1935.  L. GELBMAN  2,003,632
BUILDING BLOCK MACHINE
Filed Dec. 13, 1928   2 Sheets-Sheet 1

INVENTOR
Louis Gelbman
BY
ATTORNEY

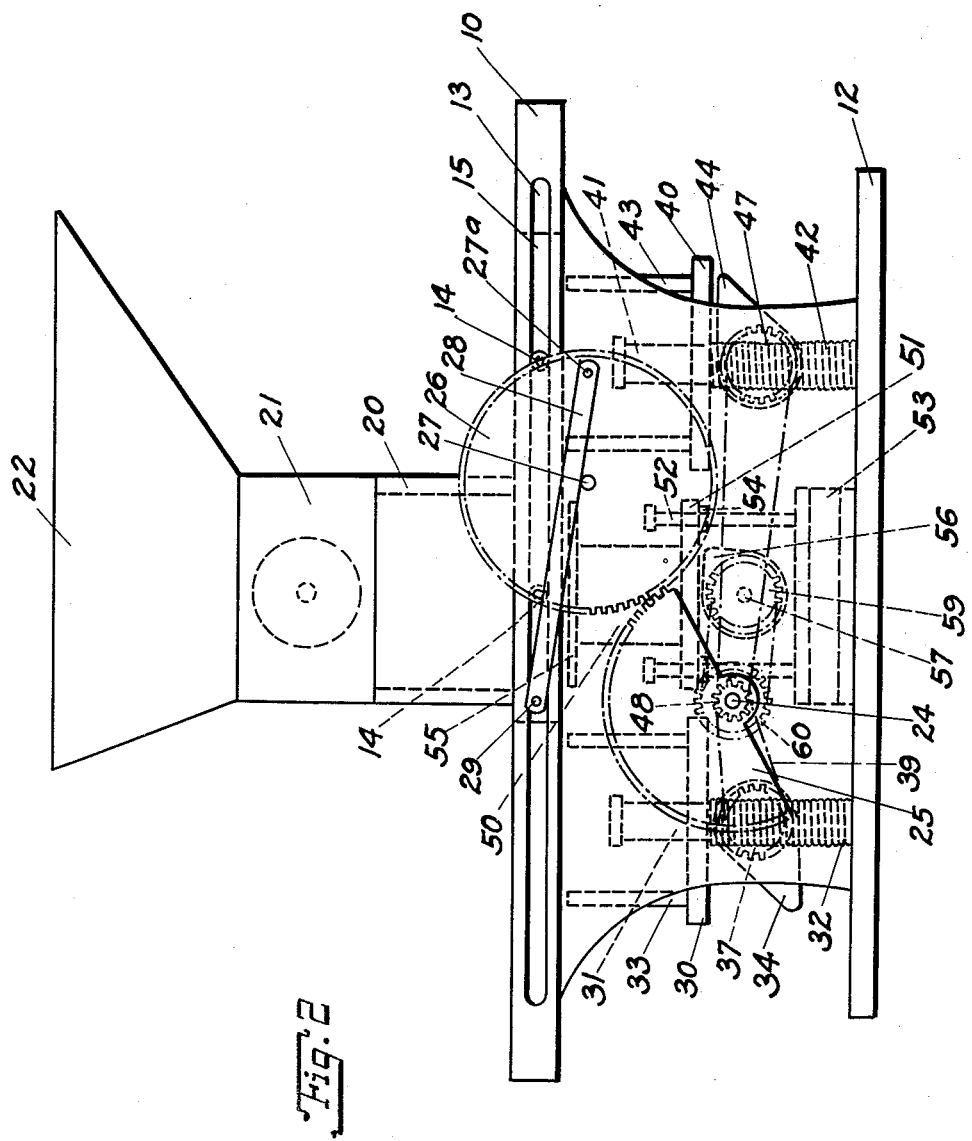

Patented June 4, 1935

2,003,632

UNITED STATES PATENT OFFICE 2,003,632

BUILDING BLOCK MACHINE

Louis Gelbman, Yonkers, N. Y.

Application December 13, 1928, Serial No. 325,673

17 Claims. (Cl. 25—41)

This invention relates generally to concrete machines and has more particular reference to a novel building block machine.

The invention has for an object the provision of a device of the class mentioned, which is of simple durable construction, desirable in use and efficient in action, and which can be manufactured and sold at a reasonable cost.

The invention proposes the use of a means for periodically vibrating a mould of the machine to pack the mould and for providing rest periods to strip the moulded material from the mould. Preferably, the mould should be one that moves automatically from its filling position to its stripping position and during its filling position, a means is provided for vibrating the mould for a short period of time to insure complete packing. This means is halted in its operation while the mould is in its stripping position so as not to break or injure the moulded blocks stripped from the mould.

This arrangement permits the use of concrete of "ideal consistency" in machines for moulding building blocks. It is generally known that concrete of ideal consistency produces the strongest possible building block as a finished product. But machines in the past have been built for handling concrete mixtures of consistencies other than ideal consistency. One particular type of machine is known as the drytamp type which uses a semi-dry mixture and with tampers forces this mixture in a mould of the machine, whereupon the blocks are immediately stripped up and out of the mould and removed to a place for a period of "curing" or "setting" during which period the Portland cement is hydrated and the blocks are getting hard.

The blocks produced by this dry-tamp method are porous and often crumbly owing to an incomplete hydration of the cement by reason of an insufficient amount of water used. The blocks produced, therefore, are not by far as strong as they would be if ideal consistency concrete would be used. But in this particular type of machine the use of ideal consistency concrete is prohibited because if more water were used the blocks would slump and thus become deformed when immediately stripped up and out of the molds.

In the engineering field, however, the need for economy brought chutes and spouts, and the employment of gravity in placing concrete. This necessitates a flowing mixture. As a result of the success of this method, the "wet-cast" building block was urged, not so much as a means of a more economical manufacture, but rather as an intended solution of the difficulties arising from the abuse of the "dry-tamp mixture" in concrete building block manufacture, viz., building blocks of poor quality having low compression strength and a high percentage of absorption.

But again it was found that concrete containing excess water, aside from being very sloppy and soupy, was also of poor quality and of low compressive strength. Further, while it was capable of readily flowing into a series of moulds, it again did not produce a building block of maximum strength, neither could the blocks be stripped or removed immediately from the moulds. As a matter of fact, the blocks would have to remain in the moulds for a period of 24 to 48 hours before the moulds could be removed from the blocks. Under such circumstances it would be impossible, as explained above, to use flowing concrete in block machines that required immediate stripping of the blocks up and out of the moulds. On the other hand should the concrete be of ideal consistency, it will not readily flow and cannot be used in the "wet-cast" building block machines, or moulds.

The organization of this invention provides a stripper machine capable of using concrete of ideal consistency, efficiently handling such concrete and producing a building block of the highest quality having maximum compressive strength and a low but sufficient percentage of absorption. The application of vibrators to ideal consistency concrete to make it flow is generally known, but this knowledge was not sufficient to build a machine applying such vibrations for packing its mould with such concrete. It was found that the vibrations set up would prevent the moulded concrete from being successfully removed from such machine and this difficulty prevented the development of such a machine. Again, it is repeated that with the instant arrangement "ideal consistency" concrete may be successfully and efficiently used in the moulding of building blocks on stripper moulding machines.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary plan elevational view of a device constructed according to this invention, and Fig. 2 is a front elevational view thereof.

The reference numeral 10 indicates generally a front wall, and 11 a parallel rear wall connected with the front wall by a base 12. Both of these walls are formed with elongated apertures 13 near their top edges receiving rollers 14 attached to and projecting from a mould frame 15. This mould frame is slidably supported between the walls so that it may move towards the left and then towards the right.

A mould 16 is mounted within the mould frame 15 and consists of a plurality of sections 17 for moulding a plurality of building blocks. Each section is provided with mould cores 18 supported on holding bars 19 also adapted for supporting pallets not shown on the accompanying drawings. A stationary shear frame 20 is attached across the walls 10 and 11 and covers certain sections of the moulds 16. This shear frame is of hollow construction arranged for receiving a mixture of ideal consistency concrete from a conveyor 21 attached along its top side and connected with a hopper 22 into which the concrete is placed after it leaves a mixer. As shown in the drawings, the mould frame 15 is in its right hand position so that the shear frame 20 covers the sections of the mould on the left portion thereof. The mould frame 15 may be moved to the left so that the particular mould sections originally beneath the shear frame 20 are then exposed on the left hand side of the shear frame while the mould sections seen on the right of the shear frame are then beneath the shear frame.

A means is provided for periodically reciprocating the mould from its right hand position to its left hand position. Dot dash lines 23 indicate the left hand position of the mould. This means consists of a driver shaft 24 rotatively mounted in the front and rear walls 10 and 11 respectively and supporting two segmental driver gears 25. These segmental driver gears are positioned on the outer sides of the front and rear walls. Driven gears 26 are fixed on a shaft 27 also supported in the front and rear walls, and mesh with the segmental driver gears 25. Each of the driven gears is provided with an eccentric pin 27ª connected with an arm 28 engaging a pin 29 projecting from the side of the mould frame 15. The pins 29 are shown passing thru the elongated apertures 13.

A left stripper plate 30 is slidably mounted upon stripper-plate posts 31 projecting from the base 12 and tension springs 32 are coaxially mounted on these posts and normally hold the stripper plate in a retracted position. A plurality of stripper rods 33 project from the stripper plate and are so spaced that they may enter within the mould 16 thru the openings left around the cores 18. A left stripper cam 34 is fixed upon a shaft 35 supported in standards 36 projecting from the base 12, and a driven gear 37 is fixed upon the shaft 35 and connects with a driver gear 38 by a sprocket chain 39. The driver gear 38 is fixed upon the driver shaft 24. The driven gear 37 is arranged for rotating at one half the speed of the driver gear 38.

A right hand stripper plate 40 is slidably mounted upon stripper plate posts 41 projecting from the base 12 and coaxial springs 42 engage upon these posts and normally hold the stripper plate in a retracted position. A plurality of stripper rods 43 project from the stripper plate 40 and are arranged for engaging in each of the sections of the mould 16 in the spaces left around the cores 18. A right stripper cam 44 is fixed upon a shaft 45 rotatively mounted in standards 46 projecting from the base 12 and a driven gear 47 is mounted upon the shaft 45 and connects a driver gear 48 mounted on the driver shaft 24 by means of a sprocket chain 49. The driven gear 47 is arranged for rotating at one half the speed of the driver gear 48.

A vibrator 50 is provided with a base plate 51 slidably mounted upon posts 52 embedded in a vibration-proof base 53. This base consists of several layers, certain of which are rubber so as to absorb vibrations and not to materially transmit them to the rest of the machine. The posts 52 are provided with collars 54 upon which the vibrator base plate 51 normally rests. A vibrator top plate 55 is connected on top of the vibrator and is positioned directly beneath and extends across all of the sections of the mould disposed beneath the shear frame 20.

A vibrator cam 56 is fixed upon a shaft 57 rotatively mounted in standards 58 projecting from the base 12. A driven gear 59 is attached upon the shaft 57 and connects with a driver gear 60 on the shaft 24 by a sprocket chain 61. The driven gear 59 is arranged for rotating at the same speed as the driver gear 60.

In operation of the device the driver shaft 24 is continuously rotated. The segmental gears 25 on shaft 24 rotate the driven gears 26 for one half a revolution at a time so that the mould frame 15 is periodically moved from one end to the other end. During the interval of time that the segmental gears 25 do not connect with the driven gears 26 the mould is in a stationary position, either at one end of the device or at the other. While in this stationary position concrete within the shear frame 20 falls very slowly by gravity into the sections of the mould thereunderneath.

Assuming the position of the mould as illustrated in the drawings the right stripper cam 44 reaches a position for raising the plate 40 and stripping the blocks in the right hand portion of the mould. Then as the cam passes this position the stripper plate 40 falls under the action of the tension springs 42. Pallets generally used in concrete machines, but not shown on the drawing, are then dropped into each of the mould sections and rest upon the holding bars 19.

During the descent of the right hand stripper plate 40 the vibrator cam 56 acts against the vibrator base plate 51 for raising the vibrator so that the top plate 55 touches against the bottom of the mould. Vigorous vibrations are then transmitted to the mould and the ideal consistency concrete within the shear frame 20 firmly settles into all corners of the mould. The vibrator cam 56 then passes this position and the vibrator moves downwards so that its base plate rests upon the collars 54.

During this period of time the driver segmental gears 25 were rotating and now again mesh with the driven gears 26 rotating these gears thru another one half revolution so that the connector arms 28 move the mould frame 15 to the left, and shear the material in the mould from the material within the shear frame 20. Then the segmental driver gears 25 disengage with the driven gears 26 providing another rest period for the mould.

During this rest period the concrete within the shear frame starts to settle within the mould sections beneath it. The left stripper cam by this time reaches a position where it raises the left stripper plate 30 so that the stripper rods 33 act against the pallets previously dropped into this mould section while it was in its prior left position, for raising the moulded blocks within these sections above the mould.

The operator of the machine then removes these blocks. The left stripper cam 34 then passes this raising position so that the left stripper plate 30 descends under the action of the tension springs 32. The vibrator cam 56 then again reaches its position for raising the vibrator 50 so that the vibrator top plate 55 again touches against the bottom of the mould transmitting vigorous vibrations thereto and solidly packing the mould with concrete.

Upon further rotation of the vibrator cam 56 the vibrator 50 again drops to its retracted position of rest upon the collars 54. By this time the segmental driver gears 25 again engage with the driven gears 26 for moving the mould in the opposite direction. In this manner the machine continues to function.

It is pointed out that when the vibrator 50 rests upon the collars 54 it has no direct connection with any other parts of the machine so that it cannot transmit vibrations to the building blocks being stripped from the machine. At the correct periods of time the vibrator cam 56 raises the vibrator into its operative position for vibrating the mould. The vibrator 50 is moved to its operative position once for each position of rest of the mould. Each of the said strippers, that is the right hand stripper and the left hand stripper functions only when the mould is so positioned that sections of the mould to be stripped are directly over the particular stripper.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A building block moulding machine, comprising a frame, a mould arranged for reciprocating therein, means for guiding material into the mould in one position of the mould, means for stripping the material from the mould in another position of the mould, and means for automatically vibrating the mould while in the first position consisting of a vibrator slidably mounted on an auxiliary frame not connected with the said frame, and arranged for moving against the mould while the mould is in the position stated.

2. A building block moulding machine, comprising a frame, a mould arranged for moving therein and composed of a plurality of sections for making a plurality of building blocks, means for guiding material into certain sections of the mould while in one position, and into the remaining sections while in a second position, means for stripping the said remaining sections of the mould while in its first position, another means for stripping the said certain sections of the mould while in its second position, and a vibrator arranged for moving against the mould in each position of the mould for a short period of time before or after the operation of the said stripping means.

3. A building block moulding machine, comprising a frame, a mould therein composed of a plurality of sections for making a plurality of building blocks, means for guiding material into certain sections of the mould during one period of time, and into the remaining sections during a subsequent period of time, means for stripping the said remaining sections of the mould during the first period of time, another means for stripping the said certain sections of the mould during the said second period of time, a continuous vibrator movably mounted and normally not transmitting material vibrations to the said mould, and means for moving the vibrator in contact with the mould in each of the said periods of time for a short period of time before or after the operation of the said stripping means.

4. In a building block machine, a frame, a mould mounted in the frame, means for stripping moulded material from said mould and mounted on said frame, a vibration unit beneath said mould, posts slidably supporting said vibration unit, a vibration-proof base on said frame and supporting said posts, collars on said posts to limit sliding of said vibrator unit to a position out of contact with said mould, and means for moving said vibrator unit against said mould to pack material into the mould and for releasing said vibrator so it rests against said collars so that its vibrations are insulated from the mould for allowing functioning of said stripping means without transmission of vibration to the mould which would cause the breakage of the moulded material.

5. In a building block machine, a frame, a mould mounted in the frame, means for stripping moulded material from said mould and mounted on said frame, a vibration unit beneath said mould, posts slidably supporting said vibration unit, a vibration-proof base on said frame and supporting said posts, collars on said posts to limit sliding of said vibrator unit to a position out of contact with said mould, and means for moving said vibrator unit against said mould to pack material into the mould and for releasing said vibrator so it rests against said collars so that its vibrations are insulated from the mould for allowing functioning of said stripping means without transmission of vibration to the mould which would cause the breakage of the moulded material, said vibration-proof base comprises several layers of material including rubber layers.

6. In a building block machine, a frame, a mould mounted in the frame, means for stripping moulded material from said mould and mounted on said frame, a vibration unit beneath said mould, posts slidably supporting said vibration unit, a vibration-proof base on said frame and supporting said posts, collars on said posts to limit sliding of said vibrator unit to a position out of contact with said mould, and means for moving said vibrator unit against said mould to pack material into the mould and for releasing said vibrator so it rests against said collars so that its vibrations are insulated from the mould for allowing functioning of said stripping means without transmission of vibration to the mould which would cause the breakage of the moulded material, said vibration-proof base includes a layer of resilient material.

7. In a building block machine, a mould, means for stripping material from said mould, a vibration unit beneath said mould, means for supporting said vibration unit to move to a position out of contact with said mould, means for insulating said vibration unit from transmitting vibrations to said mould and to said stripping means in said latter position, and means for moving said vibrator unit against said mould to pack material into the mould and for releasing said vibrator so that its vibrations are insulated from the mould for allowing functioning of said stripping means without transmission of vibrations to the mould which would cause the breakage of the moulded material.

8. In a building block machine, a mould, means for stripping material from said mould, a vibration unit beneath said mould, means for supporting said vibration unit to move to a position out of contact with said mould, vertical posts slidably supporting said vibration unit, and stops on said posts, means for insulating said vibration unit from transmitting vibrations to said mould and to said stripping means in said latter position, and means for moving said vibrator unit against said mould to pack material into the mould and for releasing said vibrator so that its vibrations are insulated from the mould for allowing functioning of said stripping means without transmission of vibrations to the mould which would cause the breakage of the moulded material.

9. In a building block machine, a mould, means for stripping material from said mould, a vibration unit beneath said mould, means for supporting said vibration unit to move to a position out of contact with said mould, means for insulating said vibration unit from transmitting vibrations to said mould and to said stripping means in said latter position comprising resilient means interposed in said means for supporting the vibration unit, and means for moving said vibrator unit against said mould to pack material into the mould and for releasing said vibrator so that its vibrations are insulated from the mould for allowing functioning of said stripping means without transmission of vibrations to the mould which would cause the breakage of the moulded material.

10. In a building block machine, a mould adapted to move from a filling to a stripping position, means for stripping said mould in its stripping position, a continuous operation vibration unit adapted to transmit vibrations to said mould prior to the operation of said stripping mechanism, and insulation means for absorbing the vibrations for preventing them from reaching the mould during said stripping operation.

11. In a device of the class described, a frame, a mould movable on said frame and adapted to move from a filling to a stripping position, means for stripping said mould and mounted upon said frame, a vibration unit mounted upon said frame and adapted to transmit vibrations to said mould prior to the operation of said stripping mechanism, and insulation means interposed between said frame and vibration unit for absorbing vibrations from reaching the mould during the stripping operation.

12. In a device of the class described, a frame, a mould movable on said frame and adapted to move from a filling to a stripping position, means for stripping said mould and mounted upon said frame, a vibration unit mounted upon said frame and adapted to transmit vibrations to said mould prior to the operation of said stripping mechanism, and insulation means interposed between said frame and vibration unit for absorbing vibrations from reaching the mould during the stripping operation, said insulation means being arranged to prevent the vibrations from said vibration unit from reaching other portions of said device during the stripping operation.

13. In a building block machine, a mold, a continuous vibrator movably mounted for engaging against said mold to pack material into the mold, and means for holding said vibrator in a position contacting with said mold and in another position out of contact.

14. In a building block machine, a mold, a continuous vibrator movably mounted for engaging against said mold to pack material into the mold, and means for holding said vibrator in a position contacting with said mold and in another position out of contact, said vibrator being located beneath said mold in both of its positions.

15. In a building block machine, a mold, a continuous vibrator movably mounted for engaging against said mold to pack material into the mold, means for holding said vibrator in a position contacting with said mold and in another position out of contact, and vibration insulation material insulating the vibrations from said vibrator reaching the mold in the latter mentioned position of the vibrator.

16. In a device of the class described, a continuous vibrator movably mounted for engaging against a mold to pack material into the mold, means for supporting said vibrator in a lowered position including insulation material insulating the vibrations from the mold, and means for lifting said vibrator against the mold.

17. A machine for molding plastic substances, comprised of a mold to receive plastic substances; a constant running vibrator independent of the mold; and means to establish selective connection between the vibrator and mold to vibrate the plastic substances in the mold.

LOUIS GELBMAN.